(12) United States Patent
Pratt et al.

(10) Patent No.: US 12,177,321 B2
(45) Date of Patent: Dec. 24, 2024

(54) PON SYSTEM OPTIMIZED FOR INTERNET OF THINGS

(71) Applicant: ARRIS Enterprises LLC, Horsham, PA (US)

(72) Inventors: Bruce C. Pratt, Stow, MA (US); David Bowler, Bedford, NH (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 18/294,147

(22) PCT Filed: Apr. 18, 2023

(86) PCT No.: PCT/US2023/018916
§ 371 (c)(1),
(2) Date: Jan. 31, 2024

(87) PCT Pub. No.: WO2023/215100
PCT Pub. Date: Nov. 9, 2023

(65) Prior Publication Data
US 2024/0348705 A1 Oct. 17, 2024

Related U.S. Application Data

(60) Provisional application No. 63/338,750, filed on May 5, 2022.

(51) Int. Cl.
*H04L 69/00* (2022.01)
*H04L 69/16* (2022.01)
*H04L 69/163* (2022.01)
*H04Q 11/00* (2006.01)

(52) U.S. Cl.
CPC .......... *H04L 69/169* (2013.01); *H04L 69/163* (2013.01); *H04Q 11/0067* (2013.01)

(58) Field of Classification Search
None
See application file for complete search history.

(56) References Cited

U.S. PATENT DOCUMENTS 9,210,100 B2 * 12/2015 Van Der Linden .......... H04L 67/1097
9,712,289 B2 * 7/2017 Jorgensen ................. H04L 9/40
10,652,765 B2 * 5/2020 Jain ......................... H04L 43/04

FOREIGN PATENT DOCUMENTS

CA 2846546 A1 * 9/2014 ............. H04L 47/32
JP 5804566 B2 11/2015

OTHER PUBLICATIONS

International Search Report and Written Opinion RE: Application No. PCT/US2023/018916, dated Aug. 4, 2023.

\* cited by examiner

*Primary Examiner* — Gerald A Smarth
(74) *Attorney, Agent, or Firm* — Chernoff, Vilhauer, McClung & Stenzel, LLP

(57) ABSTRACT

A PON system that includes an optical line terminal that processes TCP ACK packets in a manner to reduce the bandwidth used.

7 Claims, 7 Drawing Sheets

PON SYSTEM OPTIMIZED FOR INTERNET OF THINGS

CROSS REFERENCE TO RELATED APPLICATIONS

This application claims priority to U.S. PCT application serial number PCT/US23/18916 filed Apr. 18, 2023 which claims the benefit of U.S. Provisional Patent Application Ser. No. 63/338,750 filed May 5, 2022.

BACKGROUND

The subject matter of this application relates to an optical network device.

A passive optical network (PON) is often employed as an access network, or a portion of a larger communication network. The communication network typically has a high-capacity core portion where data or other information associated with telephone calls, digital television, and Internet communications is carried substantial distances. The core portion may have the capability to interact with other networks to complete the transmission of telephone calls, digital television, and Internet communications. In this manner, the core portion in combination with the passive optical network enables communications to and communications from subscribers (or otherwise devices associated with a subscriber, customer, business, or otherwise).

The access network of the communication network extends from the core portion of the network to individual subscribers, such as those associated with a particular residence location (e.g., business location). The access network may be wireless access, such as a cellular network, or a fixed access, such as a passive optical network or a cable network.

Referring to FIG. 1, in a PON 10, a set of optical fibres and passive interconnecting devices are used for most or all of the communications through the extent of the access network. A set of one or more optical network terminals (ONTs) 11 are devices that are typically positioned at a subscriber's residence location (e.g., or business location). The term "ONT" includes what is also referred to as an optical network unit (ONU). There may be any number of ONTs associated with a single optical splitter 12. By way of example, 32 or 64 ONTs are often associated with the single network optical splitter 12. The optical splitter 12 is interconnected with the respective ONTs 11 by a respective optical fiber 13, or otherwise a respective fiber within an optical fiber cable. Selected ONTs may be removed and/or added to the access network associated with the optical splitter 12, as desired. There may be multiple optical splitters 12 that are arranged in a cascaded arrangement.

The optical fibers 13 interconnecting the optical splitter 12 and the ONTs 11 act as access (or "drop") fibers. The optical splitter 12 is typically located in a street cabinet or other structure where one or more optical splitters 12 are located, each of which are serving their respective set of ONTs. In some cases, an ONT may service a plurality of subscribers, such as those within a multiple dwelling unit (e.g., apartment building). In this manner, the PON may be considered a point to multipoint topology in which a single optical fiber serves multiple endpoints by using passive fiber optic splitters to divide the fiber bandwidth among the endpoints.

An optical line terminal (OLT) 14 is located at the central office where it interfaces directly or indirectly with a core network 15. An interface 16 between the OLT 14 and the core network 15 may be one or more optical fibers, or any other type of communication medium. The OLT 14 forms optical signals for transmission downstream to the ONTs 11 through a feeder optical fiber 17, and receives optical signals from the ONTs 11 through the feeder optical fiber 17. The optical splitter 12 is typically a passive device that distributes the signal received from the OLT 14 to the ONTs 11. Similarly, the optical splitter 12 receives optical signals from the ONTs 11 and provides the optical signals though the feeder optical fiber 17 to the OLT 14. In this manner, the PON includes an OLT with a plurality of ONTs, which reduces the amount of fiber necessary as compared with a point-to-point architecture.

As it may be observed, an optical signal is provided to the feeder fiber 17 that includes all of the data for the ONTs 11. Accordingly, all the data being provided to each of the ONTs is provided to all the ONTs through the optical splitter 12. Each of the ONTs selects the portions of the received optical signals that are intended for that particular ONT and passes the data along to the subscriber, while discarding the remaining data. Typically, the data to the ONTs are broadcast to the feeder fiber 17 and provided to each of the ONTs.

Upstream transmissions from the ONTs 11 through the respective optical fibers 13 are typically transmitted in bursts according to a schedule provided to each ONT by the OLT. In this way, each of the ONTs 11 will transmit upstream optical data at different times. In some embodiments, the upstream and downstream transmissions are transmitted using different wavelengths of light so that they do not interfere with one another. In this manner, the PON may take advantage of wavelength-division multiplexing, using one wavelength for downstream traffic and another wavelength for upstream traffic on a single mode fiber.

The schedule from the OLT allocates upstream bandwidth to the ONTs. Since the optical distribution network is shared, the ONT upstream transmission would likely collide if they were transmitted at random times. The ONTs typically lie at varying distances from the OLT and/or the optical splitter, resulting in a different transmission delay from each ONT. The OLT measures the delay and sets a register in each ONT to equalize its delay with respect to the other ONTs associated with the OLT. Once the delays have been accounted for, the OLT transmits so-called grants in the form of grant maps to the individual ONTs. A grant map is a permission to use a defined interval of time for upstream transmission. The grant map is dynamically recalculated periodically, such as for each frame. The grant map allocates bandwidth to all the ONTs, such that each ONT receives timely bandwidth allocation for its service needs. Much of the data traffic, such as browsing websites, tends to have bursts and tends to be highly variable over time. By way of a dynamic bandwidth allocation (DBA) among the different ONTs, a PON can be oversubscribed for upstream traffic.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
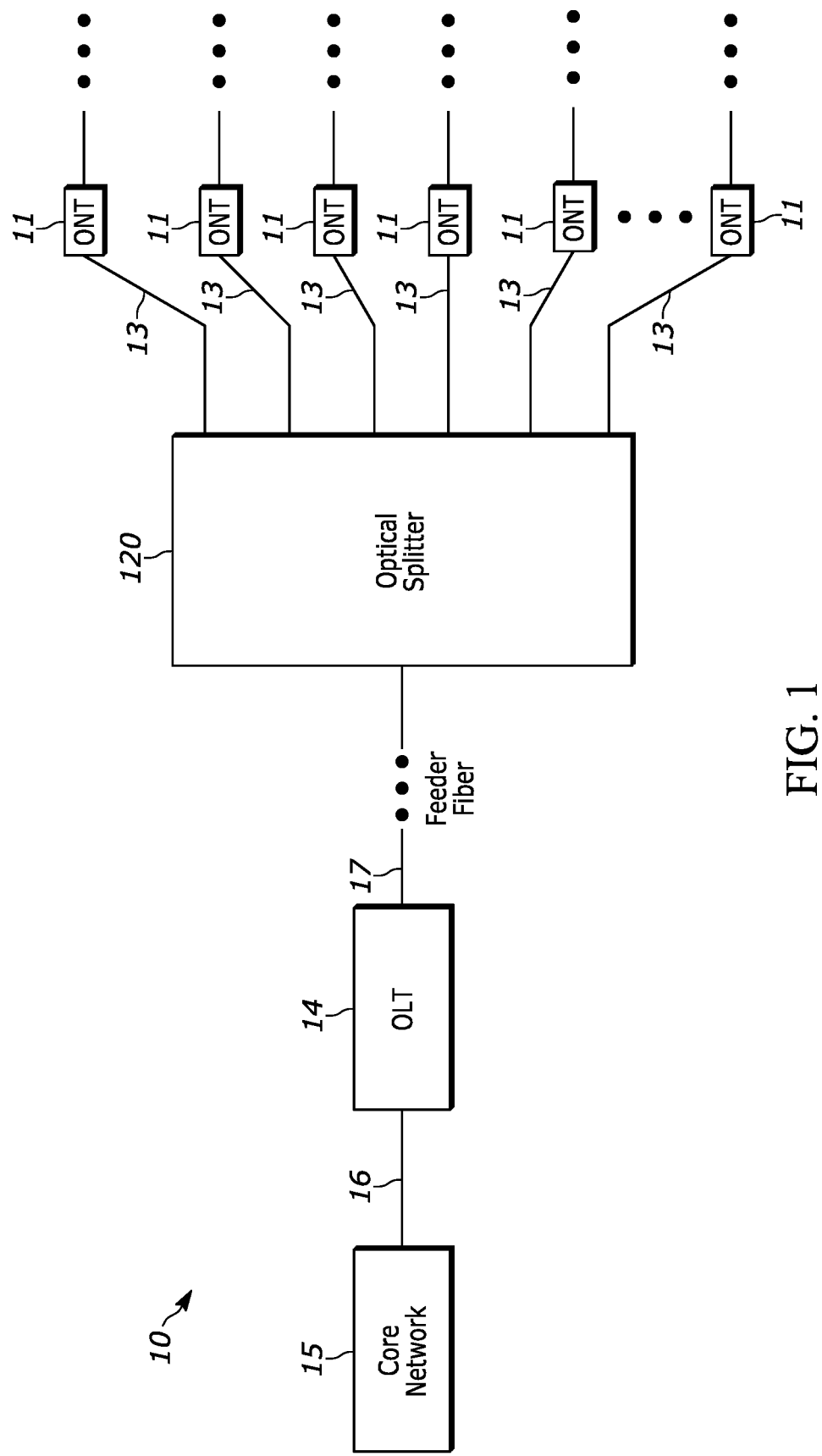
FIG. 1 illustrates a network that includes a passive optical network.
Figure 2:
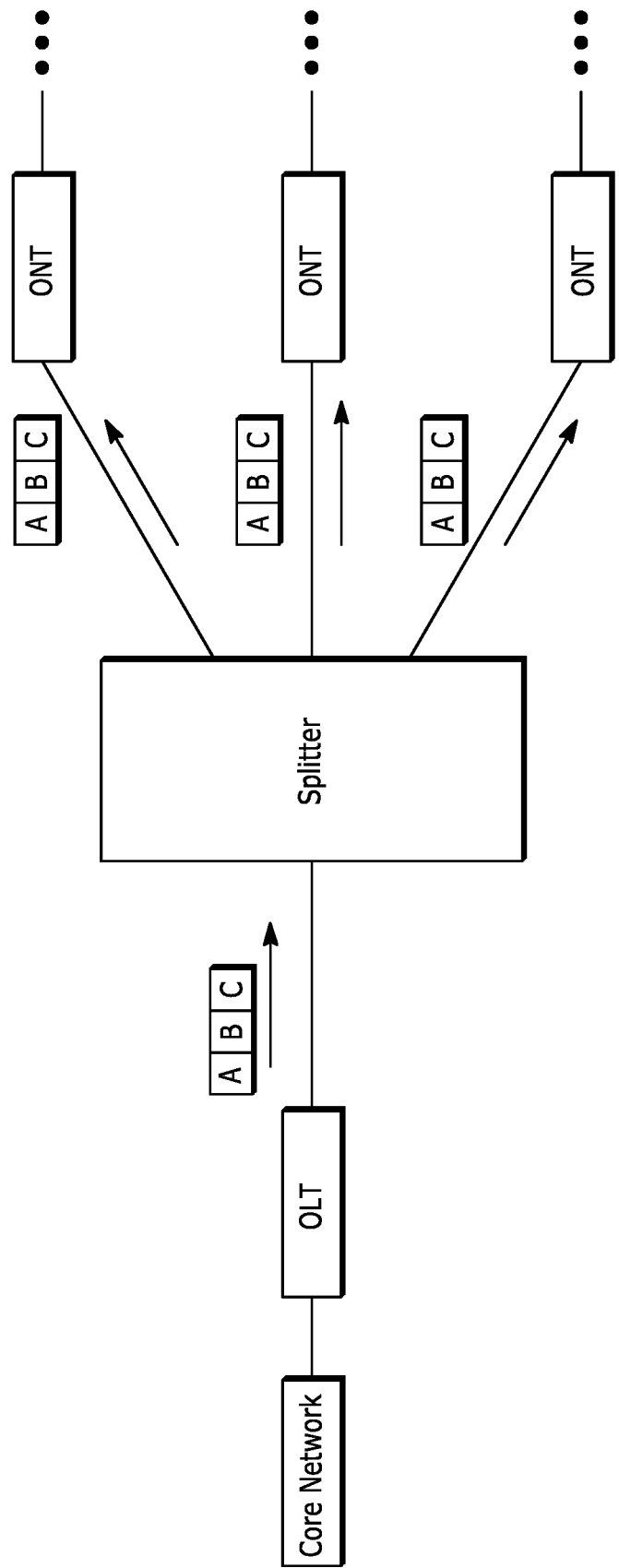
FIG. 2 illustrates a passive optical network with upstream data traffic.

Referring to FIG. 2, the PON network is based upon a point to multi-point downstream transmission arrangement. The data from the OLT is transmitted to all of the ONTs that are interconnected thereto. The data from the OLT is transmitted in the form of one or more frames, where each frame includes data for one or more of the ONTs. For example, in GPON a constant of 125 µs frame is used, where each frame includes (among other control information) an allocation map which informs on the slots granted to allocation ids. Accordingly, each frame is broken up into one or more timeslots that are designated for a corresponding selected one of the ONTs.

Figure 3:
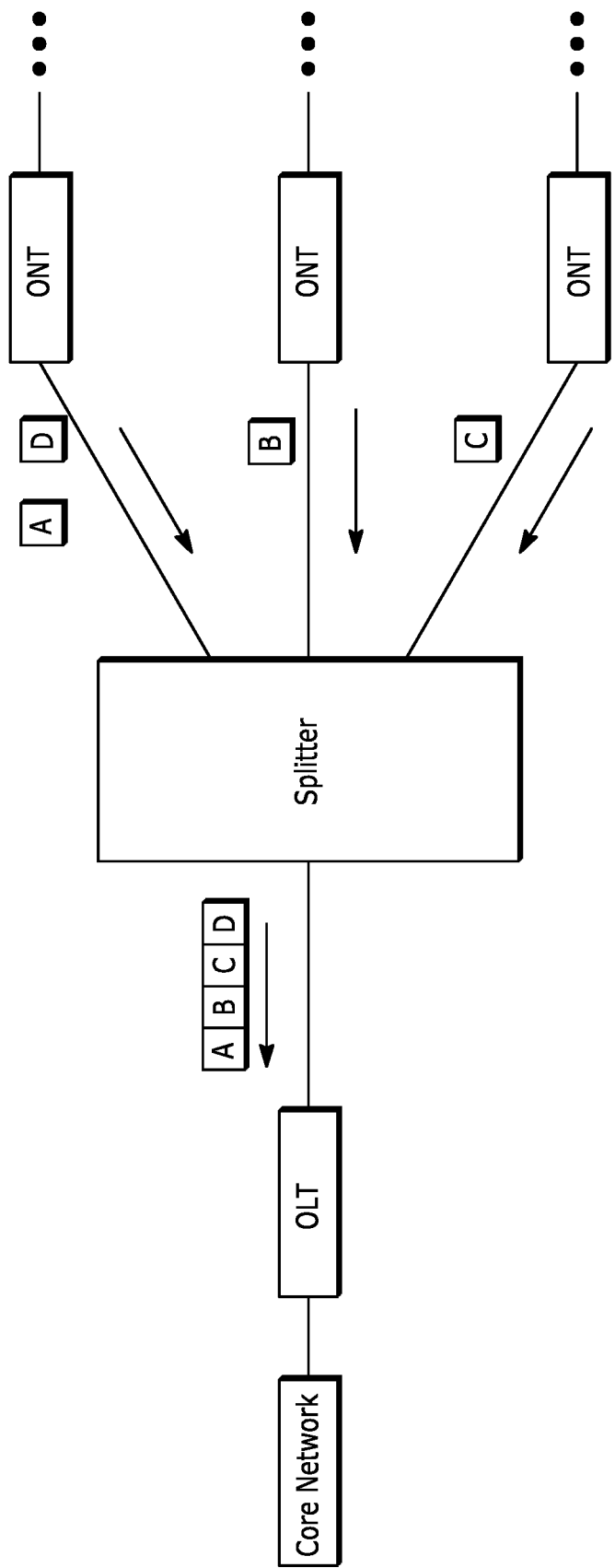
FIG. 3 illustrates a passive optical network with upstream data traffic.

Referring to FIG. 3, the PON network is based upon a multi-point to point upstream transmission arrangement using a time divisional multiple access mechanism. The OLT assigns timeslots (BWmaps) for each ONU to transmit its upstream transmission to ensure a collision free transmission. The data from each of the ONTs is transmitted to the corresponding OLT that it is interconnected thereto. The data from the ONU is transmitted in the form of a portion of one or more frames, where each frame includes data for one or more of the ONTs. For example, in GPON a reference frame of 125 µs frame is used, which is not an absolute value since a round of allocations may span through multiple upstream frames. GPON uses a Generic Encapsulation Method (GEM), which allows for the transport, segmentation and reassembly of Ethernet frames and legacy traffic (ATM or TDM). Accordingly, each frame is broken up into one or more timeslots that are designated for a corresponding selected one of the ONTs.

There is an ever-increasing number of Internet enabled devices within a residence. For example, there are smart plugs that are interconnected to the Internet to provide status of the smart plug (e.g., powered on or powered off) and the capability of remotely turning on or off the power from the smart plug. For example, there are countless other smart devices that are interconnected to the Internet (e.g., thermostats, doorbells, locks, refrigerators, televisions, toasters, etc.) to provide status of the device (e.g., powered on, powered off, or various settings) and the capability of remotely turning on or off the power or otherwise change the settings. These devices are in additional to tablets, smart phones, laptops, and desktop computers that access use the Internet. Accordingly, in a residence there may be dozens to hundreds of potentially different devices that are accessing the Internet, typically using Transmission Control Protocol Internet Protocol (TCP/IP).

By way of example, TCP is an acknowledgment (ACK) based protocol and every data packet that is received is typically acknowledged. The TCP-data packets are transmitted from the sender to the receiver, each of which transmits a TCP-ACK packet for every TCP-data packet that it receives. Thus, there is asymmetry in the traffic pattern with the TCP-ACK packet accounting for approximately half of the packets transmitted in the network. Furthermore, the TCP-ACK packets are much smaller than the TCP-data packets.

The devices of the residence are regularly providing a TCP ACK packet, which normally includes a 20 byte IP header, a 20 byte TCP header, which is often padded prior to transmission to bring it up to the Ethernet's minimum payload size of 46 bytes, which is then wrapped with a 14 byte header and a 4 byte CRC to provide an Ethernet frame size of 64 bytes. The 20 byte TCP header may be broken down to include 16 bits for a source port, 16 bits for a destination port, 32 bits for a sequence number, 8 bits for a header length, 2 unused bits, 1 bit for ACK, 1 bit for RST, 1 bit for SYN, 1 bit for FIN, 16 bits for receiver window size, etc. For a TCP ACK packet there may be no data payload, so accordingly the TCP ACK packet includes a substantial IP header and TCP header in order to provide effectively 1 bit of signalling. Other packet and header structures may likewise be used for signalling, with and without a data payload, depending on the particular networking protocols employed. The TCP ACK packets are further provided with additional signalling related information for the PON network thereby further increasing the overall number of bytes required to transmit a TCP ACK packet. As it may be observed, to provide a TCP ACK packet there is a substantial amount of overhead associated with a relatively small amount of signalling provided. With a substantial number of different devices connected to the Internet from within a single residence, each of which are consistently providing at least status data to the Internet and/or receiving status inquiries from the Internet, a significant amount of available bandwidth may be consumed by the TCP ACK packets originating from various devices.

Figure 4:
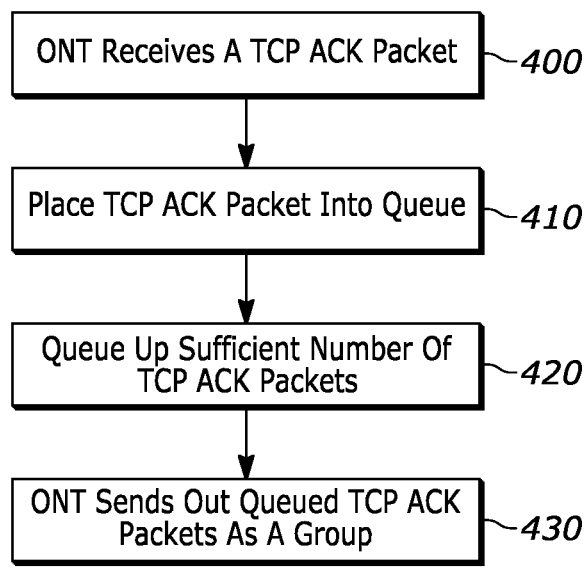
FIG. 4 illustrates a first embodiment of an ONT processing TCP ACK packets.

Referring to FIG. 4, to increase the amount of bandwidth available for packets having a substantial amount of data, it was determined that the data traffic related to the TCP ACK packets is preferably managed in such a way to reduce its effective bandwidth used. The ONT may receive a TCP ACK packet 400 from a device within the residence, and in response thereto, delay the transmission of the TCP ACK packet by placing it into a queue 410. The ONT preferably queues up a plurality of two or three or more such TCP ACK packets, and preferably substantially more than three such TCP ACK packets 420. After queueing up a sufficiently large number of such TCP ACK packets, the ONT sends out the TCP ACK packets as a group together with the additional signalling related information for the PON network 430. In this manner, the overall effective bandwidth used by the ONT is reduced.

Figure 5:
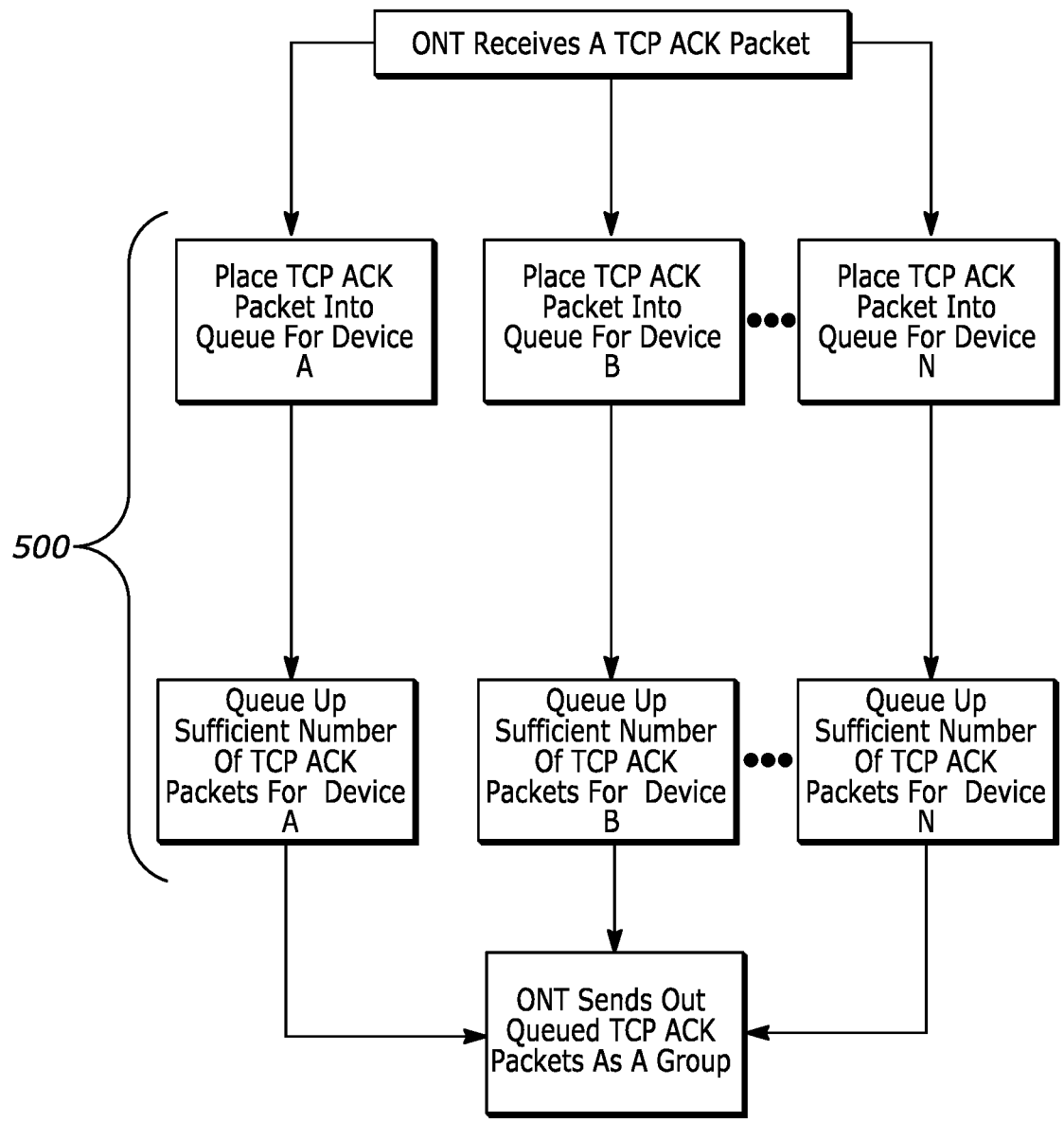
FIG. 5 illustrates a second embodiment of an ONT processing TCP ACK packets.

Referring to FIG. 5, it was further determined that it may be desirable to queue up the TCP ACK packets by the ONT on a per source device basis 500. The queue may be a respective queue for each device, or may be a single queue with the TCP ACK messages identified for each source device. In this manner, a queue of TCP ACK packets for each source device are queued, and then subsequently transmitted for each device or for a group of selected devices with the additional signalling related information for the PON network. Depending on the priority of each respective device, the queues may transmit one set of TCP ACK packets prior to another set of TCP ACK packets. In this manner, the overall effective bandwidth used by the ONT is reduced, while also providing enhanced bandwidth management.

Figure 6:
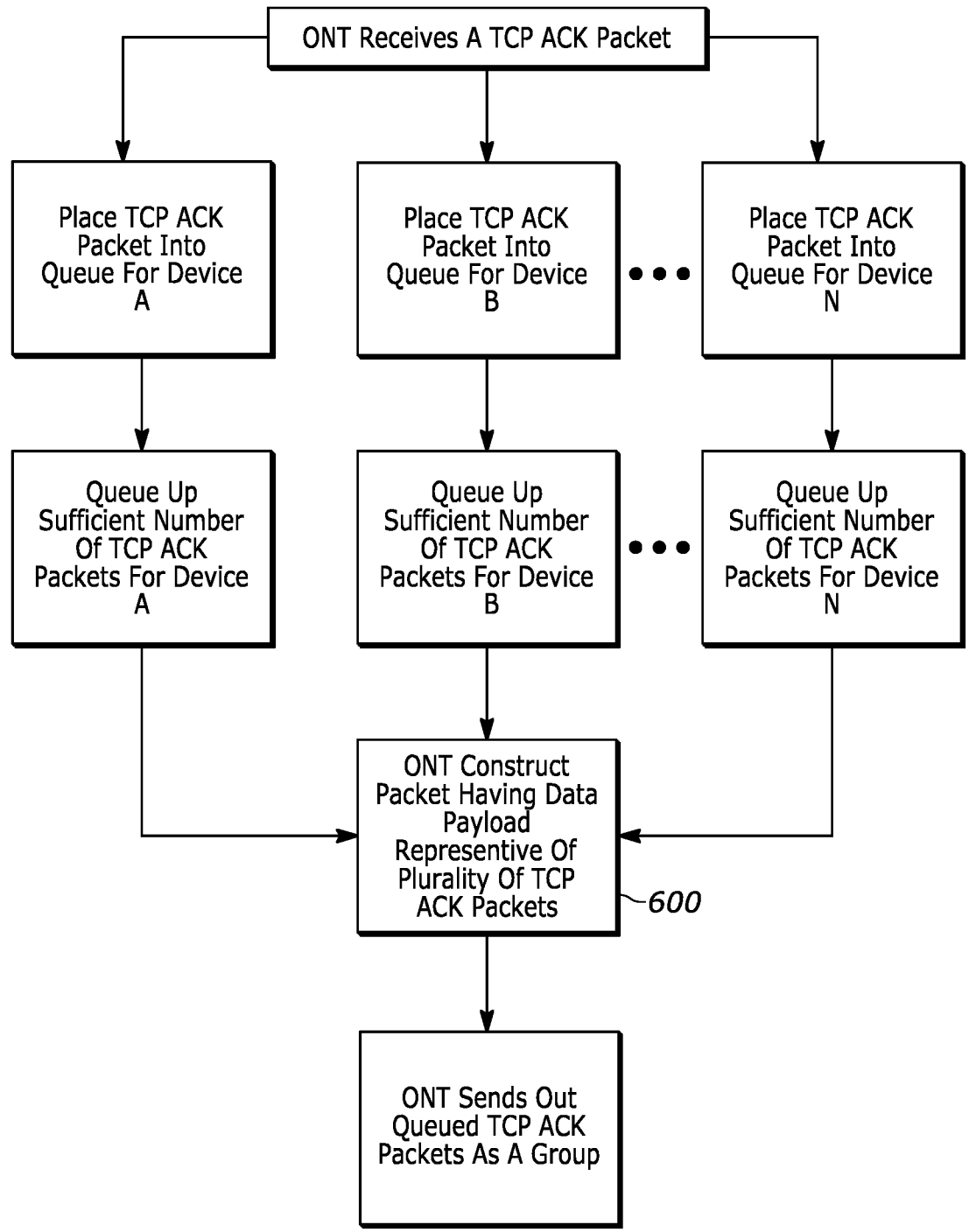
FIG. 6 illustrates a third embodiment of an ONT processing TCP ACK packets.

Referring to FIG. 6, it was further determined that elements of a set of TCP ACK packets, especially from the same source device, have elements in common. For example, the 16 bits for a source port may be common among the set of TCP ACK packets. For example, the 16 bits for a destination port may be common among the set of TCP ACK packets. For example, the 32 bits for a sequence number may be common among the set of TCP ACK packets or otherwise derivable therefrom. Other portions of the TCP ACK packets may have portions in common or otherwise derivable based upon other TCP ACK packets (such as a sequential numbering of TCP ACK packets). The ONT may provide one or more TCP IP packets that includes a data payload that indicates that the one or more TCP IP packets is representative of a respective TCP ACK packet, with information on how such a packet would be reconstructed 600 by the OLT. For example, the TCP IP packet may include data indicating the number of such TCP ACK packets, their source port (if in common), their destination port (if in common), their starting and ending sequence number (if an incremented sequence), and/or other such information. In this manner, a substantial number of TCP ACK packets, each of which are preferably from the same source device obtained from its respective queue, may be combined together in a suitable manner to reduce the overall size of the packets together with the additional signalling related information for the PON network, when provided to the OLT.

Figure 7:
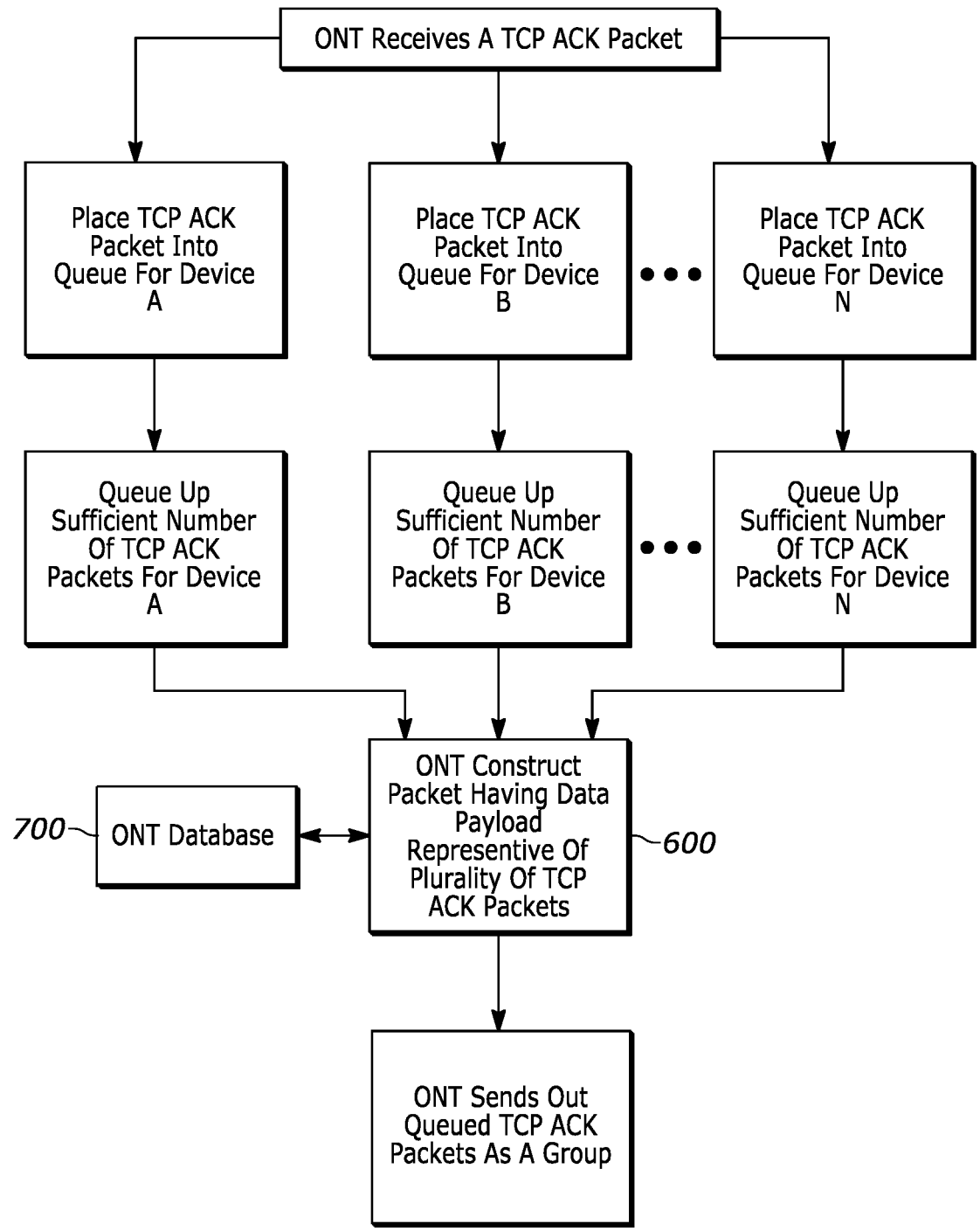
FIG. 7 illustrates a fourth embodiment of an ONT processing TCP ACK packets.

Referring to FIG. 7, the ONT may include a database 700 of some form, such as a relational database, a look up table, or otherwise, that includes information about different typical TCP ACK information related to each of the respective devices on the resident's network. For example, the database may include source port, destination port, sequence number, or otherwise for each of the respective devices. The information in the database may be constructed by the ONT by inspecting TCP ACK packets, and the resulting database may be provided and/or updated to the OLT based upon information provided by the ONT. The information for the database may be constructed by the OLT by inspecting TCP ACK packets, a copy of the database maintained by the OLT, and a copy of the database may be provided to and/or updated to the ONT based upon information provided by the OLT. The information in the database may be constructed by a network-based computing device, such as a cloud-based server, by inspecting TCP ACK packets, and the database (or information included therein) may be provided to and/or updated to the OLT and/or the ONT based upon information provided by the network-based computing device. In this manner, the database or otherwise the information contained therein, may be determined by the ONT, the OLT, and/or the cloud-based server, and distributed in a suitable manner.

The ONT may provide one or more TCP IP packets that includes a data payload that indicates that the one or more TCP IP packets is representative of a TCP ACK packet, with information on how such packets would be reconstructed based upon the data payload, in combination with the database or without the database, as desired. For example, the TCP IP packet may include data indicating the number of such TCP ACK packets, their source port (if in common), their destination port (if in common), their starting and ending sequence number (if an incremented sequence), and/or other such information, as identified in the database. In this manner, a substantial number of TCP ACK packets, each of which are preferably from the same source device obtained from its respective queue, may be combined together in a suitable manner to reduce the overall size of the packets together with the additional signalling related information for the PON network.

Further, the ONT may remove duplicate TCP ACK packets from its queue to reduce the amount of data that is being transmitted.

In a similar manner, the OLT may queue TCP ACK packets, process them in any similar manner, and provide them to the respective ONTs.

In a similar manner, a cloud-based server may queue the TCP ACK packets, process them in any similar manner, and provide them to the respective OLTs and/or ONTs.

Other types of packets such as a TCP No ACK packet may likewise be queued and processed in a similar manner, if desired.

Other types of packets, especially those without a data payload, may likewise be queued and processed in a similar manner, if desired.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An optical network terminal including a processor includes circuitry comprising:
   (a) said optical network terminal capable of receiving optical digital data from an optical line terminal from an optical fiber connection and provide optical digital data to said optical line terminal to said optical fiber connection;
   (b) said optical network terminal receiving said optical digital data from said optical line terminal and providing digital data to customer premise equipment representative of said optical digital data;
   (c) said optical network terminal receiving said digital data from said customer premise equipment and providing optical digital data to said optical line terminal representative of said digital data;

(d) said optical network terminal receiving a plurality of Transmission Control Protocol Acknowledgement (TCP ACK) packets from said customer premise equipment each of which are queued by said optical network terminal;

(e) said optical network terminal processing said plurality of TCP ACK packets to form at least a portion of a frame including information regarding said plurality of TCP ACK packets;

(f) wherein said plurality of TCP ACK packets are processed in such a manner to form a new packet including information regarding said plurality of TCP ACK packets;

(g) further comprising receiving said plurality of TCP ACK packets from a plurality of different devices, and queuing each of said plurality of TCP ACK packets in a separate queue.

2. An optical network terminal including a processor includes circuitry comprising:

(a) said optical network terminal capable of receiving optical digital data from an optical line terminal from an optical fiber connection and provide optical digital data to said optical line terminal to said optical fiber connection;

(b) said optical network terminal receiving said optical digital data from said optical line terminal and providing digital data to customer premise equipment representative of said optical digital data;

(c) said optical network terminal receiving said digital data from said customer premise equipment and providing optical digital data to said optical line terminal representative of said digital data;

(d) said optical network terminal receiving a plurality of Transmission Control Protocol Acknowledgement (TCP ACK) packets from said customer premise equipment each of which are queued by said optical network terminal;

(e) said optical network terminal processing said plurality of TCP ACK packets to form at least a portion of a frame including information regarding said plurality of TCP ACK packets;

(f) wherein said plurality of TCP ACK packets are processed in such a manner to form a new packet including information regarding said plurality of TCP ACK packets;

(g) further comprising receiving said plurality of TCP ACK packets from a plurality of different devices, and queuing each of said plurality of TCP ACK packets in a queue where each of said plurality of TCP ACK packets are identified as to one of said plurality of different devices.

3. An optical network terminal including a processor includes circuitry comprising:

(a) said optical network terminal capable of receiving optical digital data from an optical line terminal from an optical fiber connection and provide optical digital data to said optical line terminal to said optical fiber connection;

(b) said optical network terminal receiving said optical digital data from said optical line terminal and providing digital data to customer premise equipment representative of said optical digital data;

(c) said optical network terminal receiving said digital data from said customer premise equipment and providing optical digital data to said optical line terminal representative of said digital data;

(d) said optical network terminal receiving a plurality of Transmission Control Protocol Acknowledgement (TCP ACK) packets from said customer premise equipment each of which are queued by said optical network terminal;

(e) said optical network terminal processing said plurality of TCP ACK packets to form at least a portion of a frame including information regarding said plurality of TCP ACK packets;

(f) wherein said plurality of TCP ACK packets are processed in such a manner to form a new packet including information regarding said plurality of TCP ACK packets;

(g) further comprising receiving said plurality of TCP ACK packets from a plurality of different devices and using a database to characterize each of said plurality of TCP ACK packets.

4. The optical network terminal of claim 3 wherein said database is further used to form a new data packet that characterizes each of said plurality of TCP ACK packets.

5. The optical network terminal of claim 3 wherein said database is determined by said optical network terminal.

6. The optical network terminal of claim 3 wherein said database is received from said optical line terminal.

7. The optical network terminal of claim 3 wherein said database is provided by said optical network terminal to said optical line terminal.

* * * * *